United States Patent Office 2,838,433
Patented June 10, 1958

2,838,433

SOLDERING FLUX

Leonard Ribera, Fishkill, N. Y., assignor to The Texas Company, New York, N. Y., a corporation of Delaware No Drawing. Application December 2, 1955
Serial No. 550,784

2 Claims. (Cl. 148—25)

The instant invention relates to an improved soldering flux and process for its use, and more particularly, to such product and process for joining metal surfaces with alloys which melt below 800° F.

In soldering, the metal joint surfaces are generally prepared by removing oil or grease, scale, and metal oxides; then a flux is applied to prevent oxidation of the joining alloy during the heating and to assist in causing the molten solder alloy to wet the joint surfaces. After the fluxing, the molten solder alloy can be applied to jigged-up surfaces and the joint allowed to cool, or the several surfaces can be "tinned" with the alloy, then jigged and heated to form the joint. When the soldered joint has cooled, it is cleaned of residual flux, oxides which have formed on areas not covered by flux, and excess solder. The final cleaning is particularly important with convention fluxes containing muriatic acid, zinc chloride, ammonium chloride or the like because of the likelihood of serious corrosion about the joint if such flux residues are allowed to remain.

Equally important is the preparation of the metal surfaces to be joined. These may be filed, ground, sand blasted, pickled and/or deoiled with solvents, detergent baths, even with the assistance of ultra-sonic vibrations. Organic fluxes, typically rosin, are ordinarily weaker than inorganic fluxes previously mentioned and tend to be less corrosive. But frequently they have the drawback of forming gummy residues which are difficult to remove and detract from the appearance of the finished job.

My novel soldering flux consists essentially of an oxidized petroleum wax. Application of a film of said flux to metal surfaces enhances their solderability with solder containing tin and lead.

The essential ingredient of the soldering flux of my invention, the oxidized petroleum wax, can be of a number of types, e. g., an "acid" type wax oxidate, and "ester" type wax oxidate or a mixture of acid and ester types. Preferably the oxidized wax is the product of liquid phase air oxidation of a deoiled macrocrystalline paraffin wax at temperature of 230–290/ F., under pressure of 30–300 p. s. i. g., said oxidate being characterized by a ratio of neut. No. to sap. No. of above about 0.6. Detailed preparation of such oxidate is given in U. S. patent application No. 192,381, now abandoned of October 26, 1950, entitled, Process for Producing High Acid Content Wax Oxidate, by John K. McKinley.

Alternatively, I can use the highly oil soluble wax oxidate described in detail in U. S. patent application Serial No. 427,653 of May 4, 1954, entitled Ester-Type Wax Oxidate of Macrocrystalline Wax and Process for Producing Same, by John K. McKinley et al. Broadly such wax oxidate is characterized by a neut. No. above 60 and a sap. No. above 200; it has a neut. No. to sap. No. ratio between about 0.25 and 0.4 and an unsaponifible content below about 40% by weight. It is made by low pressure oxidation of macrocrystalline paraffin wax with low oil content using critical air rate, temperature and pressure conditions.

Another type of ester type wax oxidate which I have found suitable for my service is the wax oxidate described in U. S. Patent 2,705,241 of March 29, 1955, entitled Process for Producing High Viscosity Wax Oxidate, by John K. McKinley et al. Broadly this oxidate is one produced from microcrystalline petrolatum wax, has a ratio a neut. No. to sap. No. less than about 0.4 and viscosity in Saybolt Universal seconds at 210° F. between about 1500 and 11,000.

The wax oxidate in my soldering flux can be diluted with petrolatum and/or hydrocarbon oils. A little water and conventional fluxing materials such as zinc chloride or HCl can be added, but the latter are not necessary and can be undesirable. Advantageously, the wax oxidate in the flux of my invention comprises at least about 40 weight percent and is preferably at least 50 weight percent. The flux can be entirely the oxidized wax, filtered or unfiltered, as received from the oxidation reactor. The higher quality light-colored wax oxidates, which are comparatively odor-free, are preferred because under heat little if any odoriferous decomposition products are given off in their ordinary use as a flux.

Typical solders for which my flux is adapted are in the weight ratio of 1:1 lead:tin melting at about 370° F., useful for soldering lead surfaces; 3:5 lead: tin melting at about 349° F., useful for soldering zinc surfaces; and 2:5 lead:tin melting at about 338° F., useful for soldering copper, brass, bronze, iron and tinplate surfaces.

Advantages of the soldering flux of my invention over conventional fluxes are several fold. For example, they can be made highly oil soluble and effect a degreasing or deoiling of the metal surfaces by simple application. Their softening point is low enough so that under heat they run out of the joint, bearing with them foreign material. The acidity of the wax oxidate effects a type of pickling. The heat resistance of the oxidate renders it reasonably stable under the heat of soldering. Such flux dissolves oxides that may be formed during the heating operation and acts to protect the surfaces of the solder and metal from oxidation in the soldering operation. In ordinary soldering the flux of my invention is substantially free from fuming which is a common disadvantage of conventional soldering fluxes. A particularly beneficial effect of using the soldering flux of my invention is that excess flux need not be cleaned from the metal after the joint is made. In fact, the flux residue can impart a high degree of rust resistance to metal which has been coated with it.

The viscosity of the fluxes of my invention can be varied as desired between a light thin liquid and a heavy paste by selection of a particular type of wax oxidate or oxidate mixture, alternatively by dilution with petroleum oil or petrolatum. The flux can be packaged in tubes, cans, bottles or the like. It can be applied to metal surfaces by swabbing, brushing, dipping or spraying. Where a light color is desirable, a wax oxidate of light color can be used.

The following examples show ways in which my invention has been practiced, but are not to be construed as limiting the invention. Unless otherwise indicated, all parts are parts by weight.

Example 1.—A wax oxidate made by air blowing deoiled macrocrystalline paraffin wax essentially as shown in U. S. pat. appln. Ser. No. 192,381, said oxidate having neut. No. of 218, sap. No. of 338, 16.1% unsaponifiable content, and dark yellow color was applied to a pair of brass surfaces to be joined. The surfaces were jigged and soldered with a solder composed of about 1 part lead and about 1 part tin using a conventional gas-heated soldering iron. The soldering was accompanied by very little fuming and no objectable odors evolved. The finished joint was cooled and wiped with a rag. It was clean and strong, and showed no evidence of gummy residue, salt deposition or oxidation on either the solder or the base metal. After several months no corrosion or pitting could be found about the joint which had not been further treated and stored with no special protective considerations.

*Example 2.*—Two pieces of tin-coated sheet steel were tinned cleanly with the same kind of solder used in Example 1 after having been swabbed with a petroleum wax oxidate having neut. No. of 210, sap. No. of 339, and unsaponifiable content of 18%. The two tinned pieces were juxtaposed and heated, then cooled to form a clean strong joint.

Obviously, many modifications and variations of the invention, as hereinbefore set forth, may be made without departing from the spirit and scope thereof, and therefore only such limitations should be imposed as are indicated in the appended claims.

I claim:

1. A soldering flux consisting essentially of 40–100 weight percent of wax oxidate and 60–0 weight percent of at least one hydrocarbon diluent selected from the group consisting of petroleum oil and petrolatum, said wax oxidate being the product of liquid phase air oxidation of a deoiled macrocrystalline paraffin wax at temperature of 230–290° F. and pressure of 30–300 p. s. i. g. and being characterized by a ratio of neut. No. to sap. No. between about 0.6 and 0.65.

2. A method for enhancing solderability of a metal surface with tin-lead solder which comprises coating said surface with a film consisting essentially of oxidized wax preparatory to applying the solder to said surface, said oxidized wax being a product of liquid phase air oxidation of a deoiled macrocrystalline paraffin wax at temperature of 230–290° F. and pressure of 30–300 p. s. i. g. and being characterized by a ratio of neut. No. to sap. No. between about 0.6 and 0.65.

References Cited in the file of this patent

UNITED STATES PATENTS

| | | |
|---|---|---|
| 592,914 | Knox | Nov. 2, 1897 |
| 1,083,828 | Hammar | Jan. 6, 1914 |
| 2,729,665 | Buckmann | Jan. 3, 1956 |